(12) United States Patent
Kawamura (10) Patent No.: US 7,256,567 B2
(45) Date of Patent: Aug. 14, 2007

(54) PERMANENT-MAGNET GENERATOR WITH HIGH-POWER OUTPUT

(75) Inventor: Hideo Kawamura, Kouza-gun (JP)

(73) Assignee: Fuji Cera-Tech Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/447,253

(22) Filed: Jun. 6, 2006

(65) Prior Publication Data

US 2006/0273766 A1 Dec. 7, 2006

(30) Foreign Application Priority Data

Jun. 7, 2005 (JP) ............................. 2005-166461

(51) Int. Cl.
*H02P 9/14* (2006.01)
(52) U.S. Cl. ...................................... 322/46
(58) Field of Classification Search ................ 322/46; 310/190, 184, 68 R
See application file for complete search history.

(56) References Cited

U.S. PATENT DOCUMENTS

| | | | | |
|---|---|---|---|---|
| 6,072,262 A | * | 6/2000 | Kim | 310/254 |
| 6,541,887 B2 | * | 4/2003 | Kawamura | 310/190 |
| 6,700,242 B2 | * | 3/2004 | Kawamura | 310/68 R |
| 6,703,747 B2 | * | 3/2004 | Kawamura | 310/179 |
| 7,095,150 B2 | * | 8/2006 | Norell et al. | 310/194 |
| 2002/0047448 A1 | * | 4/2002 | Kawamura | 310/181 |
| 2002/0084705 A1 | * | 7/2002 | Kawamura | 310/68 R |

FOREIGN PATENT DOCUMENTS

| JP | 2001-298926 A | 10/2001 |
|---|---|---|
| JP | 2002 204556 A | 7/2002 |
| JP | 2003 264996 A | 9/2003 |

* cited by examiner

*Primary Examiner*—Julio C. Gonzalez
(74) *Attorney, Agent, or Firm*—Browdy and Neimark, PLLC (57) ABSTRACT

A high-power permanent-magnet generator in which a stator winding is divided into a first winding part and second winding parts to keep a number of turns less, and capacitors are installed between any different phases to store a current therein to raise a voltage and thereby yielding a high output. The first and second winding parts of independent from one another are both made in a three-phase arrangement of U-phase, V-phase and W-phase. The first and second winding parts are wound in a way staggered one another by one or two slots separating any two adjacent teeth of the successive stator teeth. Further, output lines of three phases are connected across respective capacitors to the remaining other output lines of different phases. The output lines of the first winding part and the second winding part are all installed with respective switches.

8 Claims, 6 Drawing Sheets

| SWITCH CODE | FIRST SWITCH CODE 26 | SECOND SWITCH CODE 24 | THIRD SWITCH CODE 27 | FOURTH SWITCH CODE 43 | FIFTH SWITCH CODE 39 | SIXTH SWITCH CODE 41 | SEVENTH SWITCH CODE 40 | EIGHTH SWITCH CODE 47 | NINTH SWITCH CODE 48 | TENTH SWITCH CODE 46 |
|---|---|---|---|---|---|---|---|---|---|---|
| LOW SPEED | ON | ON | OFF | OFF | ON | OFF | OFF | OFF | OFF | OFF |
| LOW-TO-MODERATE SPEED | ON | ON | OFF | OFF | OFF | ON | ON | OFF | OFF | OFF |
| HIGH SPEED | OFF | OFF | ON | ON | OFF | ON | ON | OFF | ON | ON |

PERMANENT-MAGNET GENERATOR WITH HIGH-POWER OUTPUT

FIELD OF THE INVENTION

The present invention relates to a high-power permanent-magnet generator that is comprised of a stator fastened inside a stator frame, and a rotor with permanent magnets adapted to turn with respect to the stator.

BACKGROUND OF THE INVENTION

It is common for most conventional permanent-magnet generators to chop an electric current by using switching regulators, and so on to keep generated voltages within prescribed limits that can be tolerated by the electric equipment using that voltage. Nevertheless, very large power-transistors are needed to switch a high voltage and/or large current between a conducting "on" state and a blocking "off" state. This would cause an increase in generator dimensions, in a heat loss or energy dissipated in cooling and further in production cost. Moreover, the large power-transistors are more likely to raise any radio blackout or radio noise caused by excessive inrush current that would develop when chopping the electric current to keep the generated voltage within desired voltage limits. Thus, the shortcomings as stated just earlier will pose some very difficult problems for the large power-transistors.

In the commonly assigned Japanese Patent Laid-Open No. 2003-264996, there is disclosed a permanent-magnet generator with self-voltage controls, in which a winding is located outside the generator to produce a braking voltage in coils, keeping constantly the generated voltage within prescribed limits. U-phase, V-phase and W-phase windings to develop a three-phase alternating current are each connected at their terminals through switching means to the coils that have winding turns or loops set in a number of turns to maintain the generated voltage in the three-phase windings within acceptable limits. Terminals of the coils are in turn connected with any electric machinery. The coils are wound around a yoke in reverse directions to form the primary side of the transformer while other coils are wound around the yoke to form the secondary side and connected to an output terminal to deliver the voltage of the prescribed level.

Another commonly assigned Japanese Patent Laid-Open No. 2002-204556 discloses a motor-generator with magnetic flux controls in which there are provided three winding groups wound on teeth in a way differing in a number of turns from one another. The magnetic flux controller operates to make position control of a cylindrical member relatively to a stator core and switching control between series and parallel connections in response to rpm of a rotor, maintaining the generated voltage within the prescribed limits. With the magnetic flux controller operated as stated earlier, the high voltage occurs when the winding groups are connected in series while the low-voltage with large amount of current is given when the winding groups are switched into parallel connection. The high voltage is derived from a winding conductor that is so tapped on a split-winding wound around a stator core as to reduce the number of the winding turns as the rpm of the rotor rises. In the windings to develop the three-phase alternating current, subdivided windings 1U, 2U and 3U; 1V, 2V and 3V; and 1W, 2W and 3W are each connected in series at their connection points that are connected through lines to switches. The flux controller constructed as stated earlier, depending on the rpm of the rotor, makes angular position control of the semi-circular member with respect to the stator and also switching control of the wiring configuration between the parallel and series connections, thereby making it possible to provide the three-phase alternating electric source of the prescribed alternating voltage.

A further another commonly assigned Japanese Patent Laid-Open No. 2001-298926 discloses a generator with two voltage ranges switched from one to the other to match the desired voltage of the electric equipment using the voltage. With the prior generator recited now, a stator is comprised of an inside circular member lying radially apart from an outside circular surface of a rotor to leave a clearance between them, the inside circular member being made with teeth spaced away from each other in circular direction to form slots sequential in circular direction, an outside circular member surrounding around the tooth tips of the teeth raised radially above the inside circular member, two systems of stator windings either distributed-wound or concentrated-wound around the teeth with spanning across preselected slots, one of which contains low power windings less in the number of turns while another of which has high power windings more in the number of turns, and terminal lines having terminals connected to any preselected low power and high power windings. The stator windings either distributed-wound or concentrated-wound around any field pole corresponding to the rotor pole are split from the series connection into some parallel connections as the rpm of the rotor rises to regulate the generated voltage, so that the generated voltage is regulated by turning on and off the switches connected to their associated wirings connected with the terminals of the stator windings.

As recited earlier with referring to three commonly assigned senior patent applications, the present inventor has worked toward a resolution of issues in the prior permanent-magnet generators. In consequently, the permanent-magnet generator was developed in which a ring to control magnetic flux is placed between a stator and a rotor to move in circular direction relatively to the stator. Circular movement of the flux control ring with respect to the stator increases or decreases the clearance for the magnetic path between radially opposite teeth of the flux control ring and the stator, regulating the magnetic flux flowing towards the stator to keep the generated voltage within the prescribed range.

Nevertheless, the prior permanent-magnet generators developed so far are not quite good enough when they are used in the land vehicles including automobiles, and so on in which the rotor experiences wide variation in rpm ranging over the high speed to low-speed. Especially, there is a major issue under very low rpm of the rotor. The permanent-magnet generator, when associated with the automotive engine, would be suffered the variation in rpm ranging over from ten-fold up to fifteen-fold. Moreover, the permanent-magnet generators are needed to have a versatile generating capacity effective in wide operating conditions ranging over from idling to 7000 rpm and, therefore, it is not easy to keep the generated voltage within the preselected limits irrespective of operating condition of the automotive engine. Only the restricted clearance between the rotor and the stator in the prior permanent-magnet generators, however, was limited in regulating the magnetic flux of the permanent magnet. Thus, it still remains a major challenge to prevent the generated voltage from coming too low level even in very low rpm, continuing to maintain the voltage of the generator within a prescribed voltage limits.

SUMMARY OF THE INVENTION

It is a primary object of the present invention to overcome the problems stated earlier and more particularly to keep a generated voltage against coming too low level even in very low rpm range of a rotor to maintain the voltage of the generator within a prescribed voltage limits. Still more particularly, the present invention provides a permanent-magnet generator with high-power output, in which phase-windings in a three-phase arrangement laid on a stator are each divided into two winding parts to keep a number of turns or loops in each phase-winding against increasing up to any excessive number of turns while capacitors are each placed between any two different phase-windings to make it possible to store a current in the capacitors to elevate a generated voltage, thereby raising an output power.

The present invention is concerned with a high-power permanent-magnet generator; comprising a rotating shaft supported for rotation in a stator housing, a rotor fastened on the rotating shaft and provided with a permanent magnet unit of permanent magnet strips positioned at an interval around the rotor, a stator installed inside the stator housing and provided with a winding wound around stator teeth lying at an interval in a circular direction;

wherein the winding is composed of a first winding part and a second winding part, which are each made independent from one another and made in a three-phase arrangement of U-phase, V-phase and W-phase, the first and second winding parts being wound on the stator teeth in a way staggered one another by one or two slots separating any two adjacent teeth; and wherein the first and second winding parts each have full output lines of the U-phase, V-phase and W-phase led out at respective winding ends and intermediate output lines of U-phase, V-phase and W-phase tapped at respective midway locations of the winding parts, three-phase circuit includes therein three-phase full-wave rectifier circuits connected to the U-phase outputs, V-phase outputs and W-phase outputs of the full output lines and the intermediate output lines, capacitors installed between different phases, and switching means to switch the three-phase circuits from one to another of series connection and parallel connection dependent on output levels.

In an aspect of the present invention, a high-power permanent-magnet generator is disclosed in which the first winding part has first output lines of three phases, which are each provided with first switches and further connected across respective first capacitors to the remaining output lines of different phases, the second winding part has second output lines of three phases, which are each provided with second switches and further connected across respective second capacitors to the remaining output lines of different phases, the first winding part has intermediate output lines of three phases, which are each tapped at their associated midway locations of the first winding part, the intermediate output lines being each provided with third switches and further connected across respective third capacitors to the remaining intermediate output lines of different phases, the second winding part has intermediate output lines of three phases, which are each tapped at their associated midway locations of the second winding part, the intermediate output lines being each provided with fourth switches and further connected across respective fourth capacitors to the remaining intermediate output lines of different phases, and the first and second output lines and intermediate output lines are all connected to a load through rectifiers of the three-phase full-wave rectifier circuits.

In another aspect of the present invention, a high-power permanent-magnet generator is disclosed in which the rectifiers are composed of first rectifiers connected with the first output lines through a seventh switch, second rectifiers connected with the second output lines through a sixth switch, third rectifiers connected with the first intermediate output lines through a ninth switch, and fourth rectifiers connected with the second intermediate output lines through a tenth switch, the first and second rectifiers being connected with one another through a fifth switch while the third and fourth rectifiers being connected with one another through a eighth switch.

In another aspect of the present invention, a high-power permanent-magnet generator is disclosed in which output terminals of the first and second rectifiers and output terminals of the third and fourth rectifiers are all connected to the load through the fifth to tenth switches in a way the output terminals of the first and second rectifiers make either series or parallel connection with output terminals of the third and fourth rectifiers.

In a further another aspect of the present invention, a high-power permanent-magnet generator is disclosed in which the first to tenth switches are governed to make on-off operation in response to an rpm of the rotor to generate a voltage within a prescribed limits.

In another aspect of the present invention, a high-power permanent-magnet generator is disclosed in which first and second output lines make series connection when the rotor is driven at low speed, making parallel connection when the rotor is driven at low-to-moderate speed, and the first intermediate output lines of the first winding part and the second intermediate output lines of the second winding part make parallel connection when the rotor is driven at high speed.

In another aspect of the present invention, a high-power permanent-magnet generator is disclosed in which the first, second and fifth switches are closed whereas the third, fourth, sixth and seventh switches are opened in response to a low speed rotation of the rotor to energize both the first and second winding parts and thereby the first and second rectifiers are brought into series connection.

In another aspect of the present invention, there is disclosed a high-power permanent-magnet generator in which the first, second, sixth and seventh switches are closed whereas the third, fourth and fifth switches are opened in response to a low-to-moderate speed rotation of the rotor to energize both the first and second winding parts and thereby the first and second rectifiers are brought into parallel connection.

In a further another aspect of the present invention, there is disclosed a high-power permanent-magnet generator in which the first, second, fifth and eighth switches are opened whereas the third, fourth, sixth, seventh, ninth and tenth switches are closed in response to a high speed rotation of the rotor to energize both the first and second intermediate output lines of the second winding part and thereby the first and second rectifiers are brought into parallel connection while the third and fourth rectifiers are also brought into parallel connection. Thus, the high-power permanent-magnet generator of the present invention is so constructed as to turn the first to tenth switches on or off selectively depending on the revolving speed of the rotor to ensure the prescribed voltage, thereby yielding the optimal output.

With the high-power permanent-magnet generator constructed as stated earlier, the three-phase winding is made to lessen the number of turns while capacitors are installed between any different phases of three phases to store the current therein so that the stored current serves to boost the generated power. While the high-power permanent-magnet generator of the present invention will be recited later in connection with the wiring connections made under three different rpm of the rotor, it will be understood that other alternative connections may be effective so long as selective on-off switching operation of the first to tenth switches in response to the rpm of the rotor does more to maintain the voltage within prescribed limits, thereby producing the optimal output.

In the permanent-magnet generator in which the rotor has the permanent magnets, typically, the generated voltage is small at, especially, low rpm and the resultant power is also small.

Electromotive force $E_0$ of the generator can be expressed by the following equation;

$$E_0 = 4.44 \cdot \Phi \cdot f \cdot Ws \quad \text{Eq. (1)}$$

$$E = E_0 - I \cdot [R^2 + (2\pi \cdot f \cdot L)^2]^{1/2} \quad \text{Eq. (2)}$$

where "$E_0$" is the electromotive force, $\Phi$ the magnetic force, "f" the frequency (rpm), "Ws" the number of turns, "E" the working voltage, "I" the current and "L" inductance in winding.

Enhancing the electromotive force "$E_0$" needs to increase any of the number of turns, magnetic force and frequency. The electromotive force does not go high under, especially, a low rotating speed or rpm and, therefore, the output power is still tiny. Large number of turns in the winding, as apparent from Eq. (2) stated earlier, renders the inductance more to prevent the generated current from going high.

Keeping the number of turns relatively less, in other words, laying two windings made less in inductance to overlap each other was found effective to keep the voltage high even at a low rpm of the rotor, thereby boosting up the output in the high-power permanent-magnet generator of the sort recited here. To this end, the winding of each phase is divided into two halves, which are wound on the stator teeth in a way staggered one another by one or two slots separating any two adjacent teeth of the successive stator teeth and the capacitors were each installed between different phases, while the output currents are each subjected to the three-phase rectification and the resulting rectified currents are superposed one on the other in either parallel or series to boost up the generated voltage and power output above 1.5 times. With the high-power permanent-magnet generator, even if the stator windings laid in a manner staggered one another by one or two rows of slots are connected together in parallel, the mutual interference could take place in the two windings, raising a ring current to cause heat and output loss. To cope with this difficulty, the capacitors are installed between the windings of different phases while the generated outputs are processed with the three-phase rectifier. Then, the superposition of the resulting rectified outputs is carried out without any interference, providing superposition benefits in voltage rise and thereby increase of power output.

Other objects and features of the present invention will be more apparent to those skilled in the art on consideration of the accompanying drawings and following specification wherein are disclosed preferred embodiments of the present invention with understanding that such variations, modifications and elimination of parts may be made therein as fall within the scope of the appended claims without departing from the spirit of the invention.

DETAILED DESCRIPTION OF THE PREFERRED EMBODIMENTS

A high-power permanent-magnet generator constructed according to the present invention is well adapted for installation to automotive engines in, for example the land vehicles such as automobiles and so on, in which the permanent-magnet generator will experience successively large variation in electric load, especially heavy electric load under which a rotor might be forced to rotate at very low speed.

The high-power permanent-magnet generator of the present invention will be disclosed hereinafter with reference to the accompanying drawings. The present permanent-magnet generator with high-power output according to the present invention is most suitable for generating output voltages from driving power of the automotive engine which would experience large variations in load.

Figure 3:
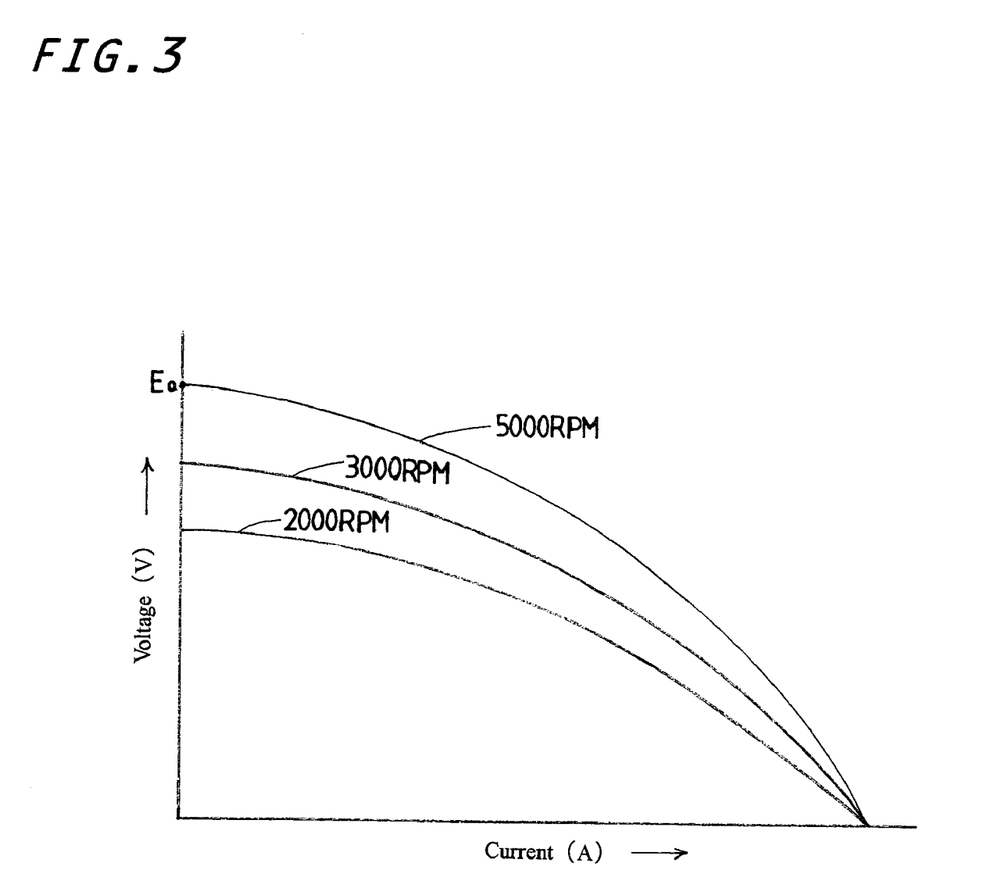
FIG. 3 is a graphic representation of voltage vs. current in the permanent-magnet generator of the present invention.

In accordance with a correlation between current (A) and voltage (V) of the present high-power permanent-magnet generator shown in FIG. 3, the more a rpm of a rotor 3 is, the greater a voltage generated is. If the current rises under no-load voltage condition, an opposing electromotive force causes the voltage to drop gradually in drooping state. As the rpm of the rotor 3 increases, the no-load voltage will rise whereas the drooping current remains unchanged. Enhancing an output power at low rpm in the permanent-magnet generator needs to make the no-load voltage raised. Increasing a number of turns or loops in a winding 14 results in rendering the drooping current less while decreasing the number of turns or loops in the winding 14 will make the drooping current more, but keeping the voltage against going high. Meanwhile, increase of output power (=I×E) needs to render the current "I" more. To this end, it will be considered to make the winding inductance "L" recited in the Eq. (2) less. With the high-power permanent-magnet generator of the present invention, the winding 14 is divided into two winding parts: a first winding part 18 (including 18U, 18V and 18W) and a second winding part 19 (including 19U, 19V and 19W) to make a number of turns in respective winding parts less to reduce the inductance "L". Moreover, capacitors 30 are each installed between any different phase-windings to store once the current therein.

Figure 1:
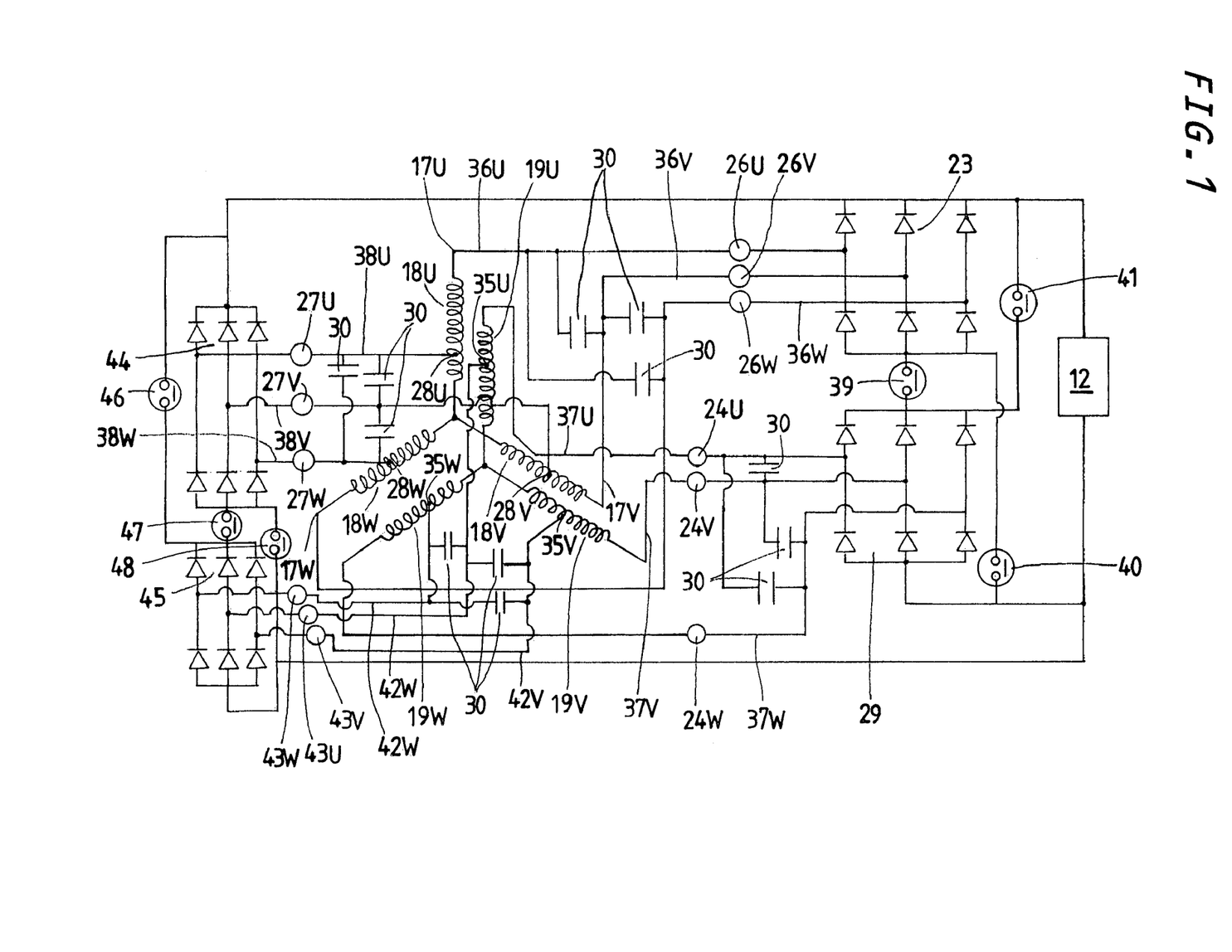
FIG. 1 is a circuit diagram explanatory of a preferred embodiment of a high-power permanent-magnet generator constructed in accordance with the present invention.
Figure 2:
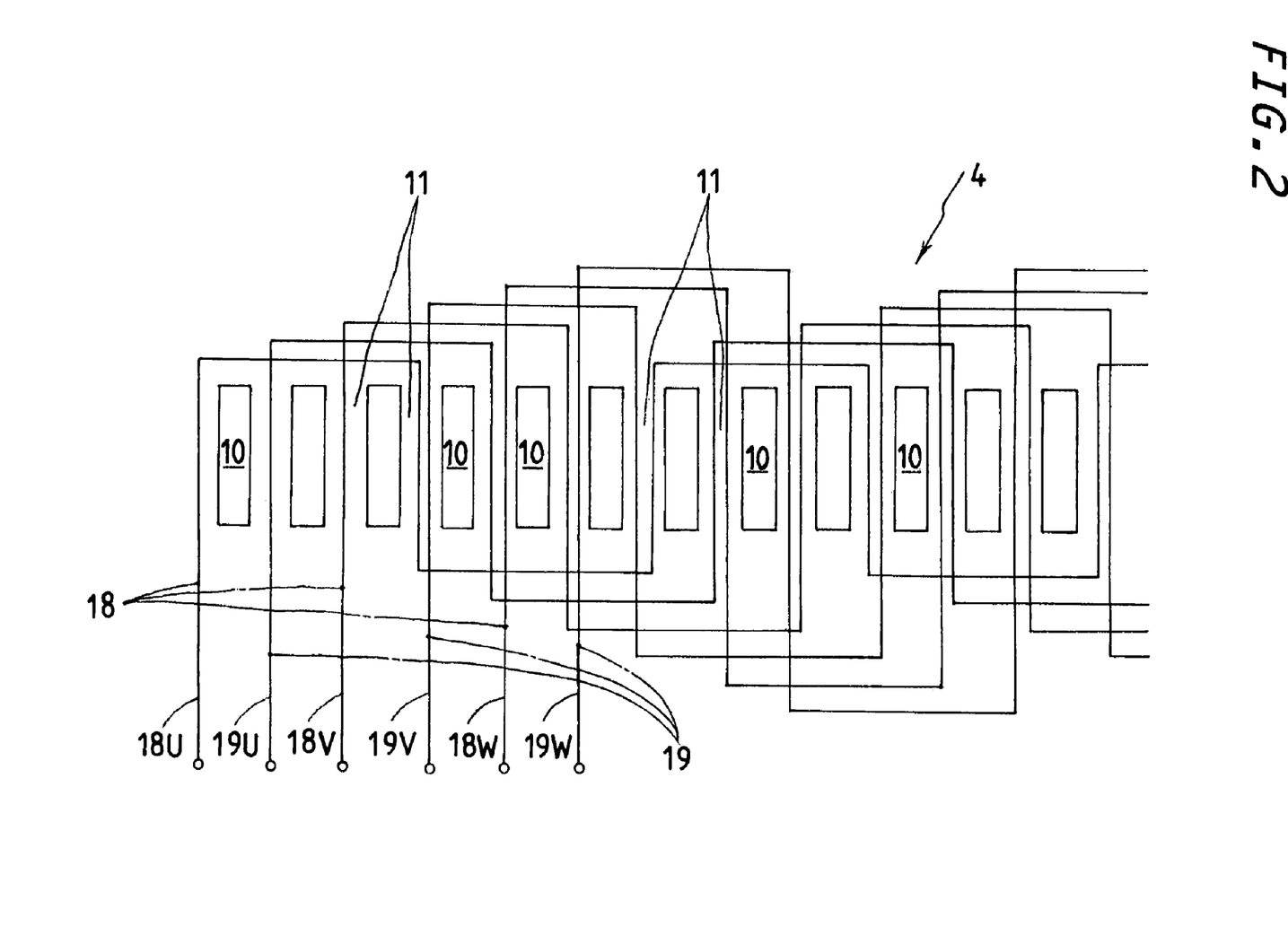
FIG. 2 is a schematic representation explaining how phase-windings are wound on a stator in the circuit in FIG. 1.

With the high-power permanent-magnet generator constructed to envisage realizing requisite conditions as stated earlier, the three-phase winding 14 as shown in FIGS. 1 and 2 is divided into the first winding part 18 and the second winding part 19, which are independent from one another to render the number of turns in the three-phase winding 14 less and also laid one over the other to make the voltage greater to thereby raise the output power. The first and second winding parts 18 and 19 are wound on the stator teeth 10 in a way staggered one another by one or two slots 11 separating any two adjacent teeth of the successive stator teeth 10 to make it possible to superpose the outputs one over the other with causing no interference. That is to say, with the high-power permanent-magnet generator shown here, the second winding part 19 as shown in FIG. 2 is wound on the stator teeth 10 in such a way staggered by one or two slots 11 with respect to the first winding part 18 to bring the impacts on voltage rise as well as increased output at low speed or rpm. There is shown in FIG. 2 a construction in which the first and second winding parts 18 and 19 are wound on the stator teeth 10 in a way staggered one another by one slot 11. The high-power permanent-magnet generator of the present invention features that the first winding part 18 and the second winding part 19 have output lines 36, 37 at their respective winding terminals, intermediate output lines 38, 42 tapped at their midway locations 28, 35, the output lines 36, 37, 38 and 42 being all connected to their three-phase full-wave rectifier circuits provided respectively for U-phase output, V-phase output and W-phase outputs, and further capacitors 30 are each installed between phases different from one another while three-phase rectifier circuits are regulated to switch from one to another of series and parallel connections in time for the output levels.

With the high-power permanent-magnet generator constructed according to the present invention, especially, the U-phase, V-phase and W-phase output lines 36 (36U, 36V, 36W) belonging to the first winding part 18 are each connected to any remaining different-phase output lines through the capacitors 30, while the U-phase, V-phase and W-phase intermediate output lines 38 (38U, 38V, 38W) belonging to the first winding part 18 are also connected to any remaining different-phase intermediate output lines through the capacitors 30. Moreover, the U-phase, V-phase and W-phase output lines 37 (37U, 37V, 37W) belonging to the second winding part 19 and the U-phase, V-phase and W-phase intermediate output lines 42 (42U, 42V, 42W) belonging to the second winding part 18 are also connected through the capacitors 30 in the same manner as the output lines and the intermediate output lines in the first winding part 18. Opposing electromotive current is stored in the capacitors 30 as magnetic poles revolve or move. Then, the current reverses gradually in flowing direction as N-poles change to S-poles and thereby a converted current is given off to raise an electric power, increasing the output. As opposed to the circuit arrangement of the present invention recited earlier, most prior circuit arrangement there is no capacitor between different-phase windings would permit large opposing electromotive current developed upon conversion from the N-poles to the S-poles to flow into an S-pole waveform, making the waveform collapsed and thereby making the drop of voltage rise less when the three phases are overlapped one over the other.

With the high-power permanent-magnet generator constructed as stated earlier, the U-phase, V-phase and W-phase output lines 36 (36U, 36V, 36W) in the first winding part 18 and the U-phase, V-phase and W-phase output lines 37 (37U, 37V, 37W) in the second winding part 19 are each connected to respective first switches 26 (26U, 26V, 26W) and second switches 24 (24U, 24V, 24W). In the high-power permanent-magnet generator of the present invention, moreover, the first three-phase winding parts 18 (18U, 18V, 18W) have output terminals 17 (17U, 17V, 17W) that are connected through the output lines 36 (36U, 36V, 36W) to a first three-phase rectifier 23 including Zener diodes in a three-phase full-wave rectifier circuit, while the second three-phase winding parts 19 (19U, 19V, 19W) have the output lines 37 (37U, 37V, 37W) that are connected to a second three-phase rectifier 29 including Zener diodes in a three-phase full-wave rectifier circuit. Rectified powers out of the three-phase rectifiers 23, 29 are connected together in series or parallel to a load 12.

With the high-power permanent-magnet generator of the present invention, the U-phase, V-phase and W-phase intermediate output lines 38 (38U, 38V, 38W) tapped at intermediate locations 28 (28U, 28V, 28W) of the first winding parts 18 are each connected to any remaining different-phase intermediate output lines through the capacitors 30 and further connected to the load 12 through respective third switches 27 (27U, 27V, 27W) and a third three-phase rectifier 44 including Zener diodes. Moreover, the U-phase, V-phase and W-phase intermediate output lines 42 (42U, 42V, 42W) tapped at intermediate locations 35 (35U, 35V, 35W) of the second winding parts 19 are each connected to any remaining different-phase intermediate output lines through the capacitors 30 and further connected to the load 12 through respective 43 (43U, 43V, 43W) and a fourth three-phase rectifier 45 including Zener diodes.

Figure 5:
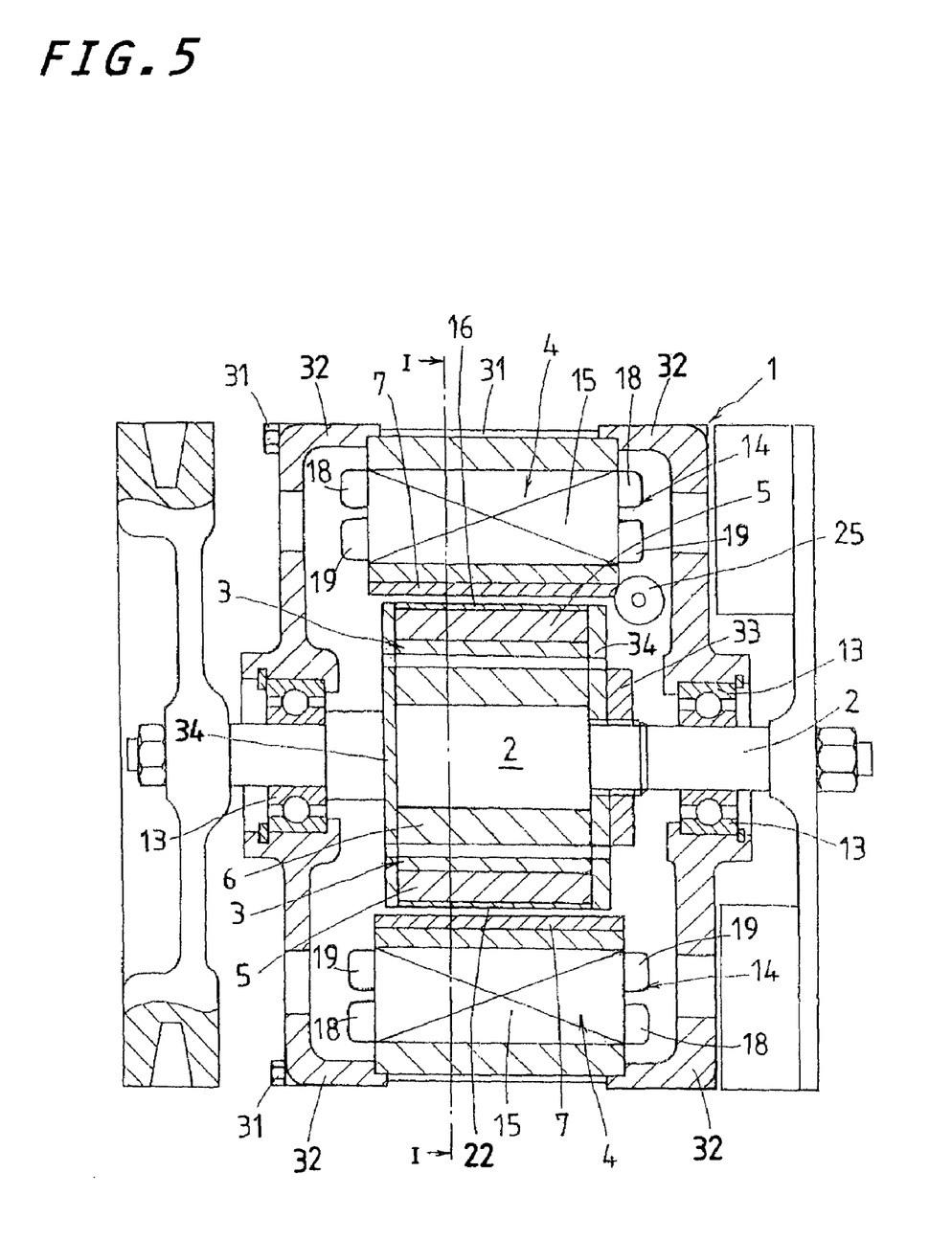
FIG. 5 is a view in lengthwise section of the preferred embodiment of the high-power permanent-magnet generator of the present invention.
Figure 6:
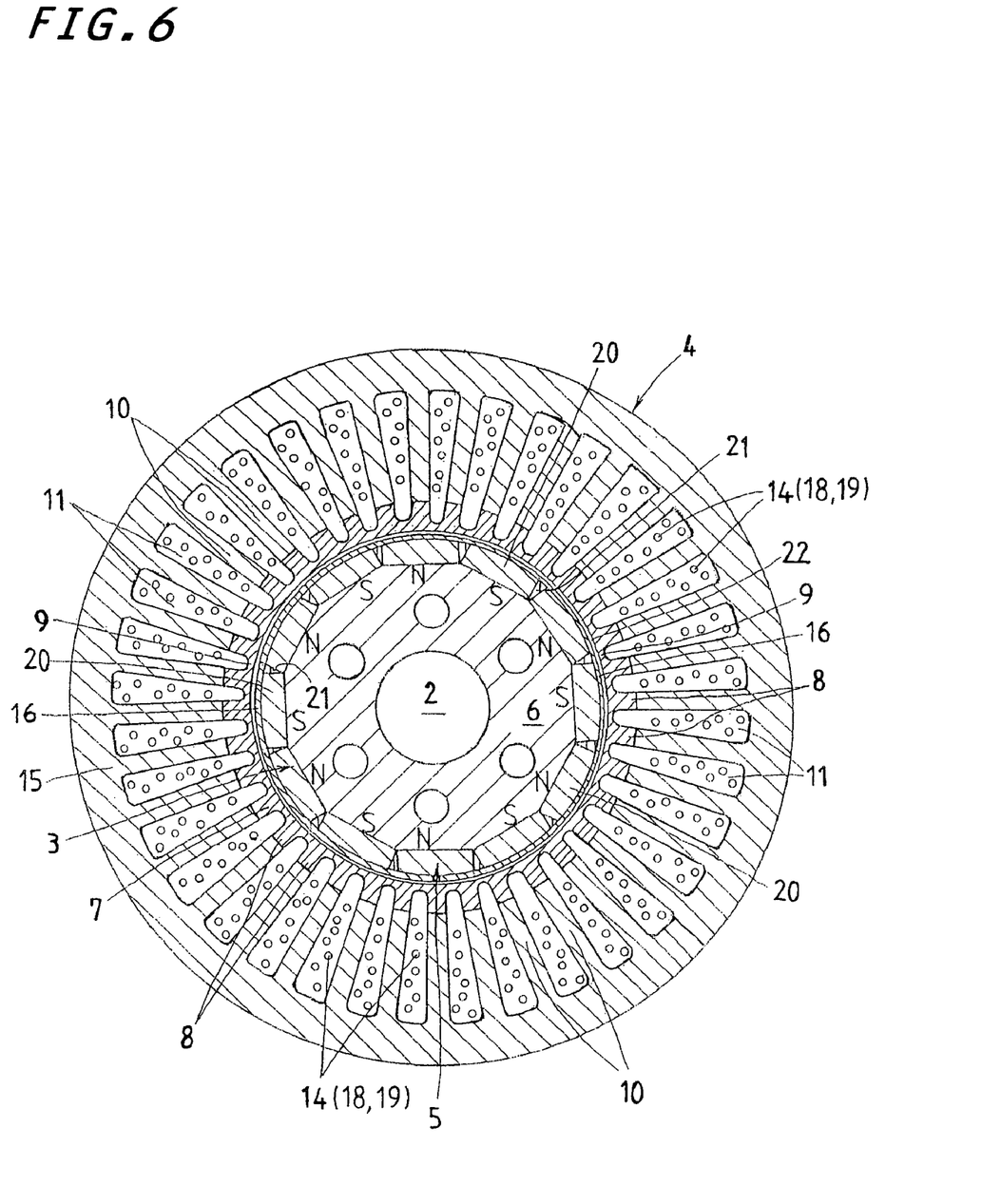
FIG. 6 is a view in transverse section of the high-power permanent-magnet generator of FIG. 5 taken on the plane I-I of that figure.

The high-power permanent-magnet generator of the present invention, as shown in FIGS. 5 and 6, is in general comprised of a stator housing 1 to accommodate therein a rotor 3 and a stator 4 and also provide a part of magnetic path, a rotating shaft 2 supported in the stator housing 1 for free rotation through axially opposite bearings 13, the rotor 3 having a permanent magnet unit 5 fastened to the rotating shaft 2, the stator 4 being fastened to the stator housing 1 in a way spaced apart from an outside circular surface of the rotor 3, and a flux regulation mechanism having a flux regulator ring 7 installed inside an inside circular surface of the stator 4 and supported through insulating bearings, not shown, in the stator housing 1 for circular movement relatively to the stator 4. The permanent-magnet generator further has an actuator 25 including a solenoid valve, motor, and so on to cause the flux regulator ring 7 to move circularly with respect to the stator 4 depending on driven condition of the rotor 3. The rotor 3 is made at any one of axially opposite ends thereof with a stopper of end plate 34 fastened to the rotating shaft 2 with using any screws, while at another axial end thereof with another retainer plate 34, which is forced towards the stopper when a nut 33 is fastened on the rotating shaft 2 to lock in place the rotor 3 on the rotating shaft 2. Moreover, the rotating shaft 2 is supported for rotation on the stator housing 1 with using the bearings 13 at axially opposite ends thereof, one bearing 13 to each end.

With the high-power permanent-magnet generator of the present invention, the stator 4 fastened inside the stator housing 1 has stator teeth 10 lying sequentially in circular direction in a way separating any two adjacent slots 11 in which coils or windings 14 are laid. The rotor 3 fastened around the rotating shaft 2 supported for rotation in the stator housing 1 has the permanent magnet unit 5 having permanent magnet strips 20, which are juxtaposed around the rotor 3 in a circular direction in a geometry spaced apart from each other. The flux regulator ring 7 lying in a circular clearance 22 defined between the stator 4 and the rotor 3 is actuated to move in circular direction relatively to the stator 4 to regulate the amount of magnetic flux. The stator housing 1 is composed of, for example a pair of axially opposite frame halves and connecting bolts 31 to join together the frame halves. Moreover, the flux regulator ring 7 is supported for rotation in the stator housing 1 with using insulating bearings, not shown, to turn relatively to the stator 4 that is made up of a stator core 15 and stator windings 14 laid on the stator core 15. Inside the stator core 15, there are made the stator teeth 10 lying sequentially in circular direction in a way separating any two adjacent stator slots 11. With the permanent-magnet generator constructed as stated earlier, the windings 14 wound around the stator teeth 10 are composed of, for example a first output winding parts 18 (18U, 18V, 18W) and a second output winding parts 19, which are both able to carry a three-phase current of U-phase, V-phase and W-phase.

The flux regulator ring 7 has teeth 8 raised above the ring 7 and positioned around an outside curved surface of the ring 7 at regular intervals corresponding to the stator teeth 10 of the stator 4. The teeth 8 on the flux regulator ring 7 are chamfered at their tooth tip corners, not shown. With the high-power permanent-magnet generator constructed as stated earlier, magnetic paths are created across air gaps between the beveled tips, not shown, of the stator 4 and the beveled tips of the teeth 8 on the flux regulator ring 7, other air gaps between the top lands of the stator teeth 8 and the bottom lands in the sequential teeth 8, and further other air gaps between the top lands of the teeth 8 on the flux regulator ring 7 and the stator slots 11. In the high-power permanent-magnet generator recited earlier, circular movement of the flux regulator ring 7 relatively to the stator 4 depending on a rpm of the rotating shaft 2 causes the air gaps between them to get increasing or decreasing to regulate the magnetic flux reaching the stator 4, thereby expected to maintain the voltage of the generator within a prescribed voltage range. The rotor 3 is composed of a rotor yoke 6, the permanent-magnet unit 5 positioned around the rotor yoke 6, and a circular reinforcement 16 encircling around the circular outside surfaces of the permanent-magnet unit 5, which are each made up of more than one permanent-magnet strip 20 extended axially and arranged circularly in circumferential direction with nonmagnetic pieces 21 being each interposed between any two adjoining permanent-magnet strips 20. Especially, the permanent-magnet unit 5 of the rotor 3 is composed of twelve identical permanent-magnet strips 20, each of which is made curved over thirty degrees in circular direction. Moreover, the permanent-magnet strips 20 to make the permanent-magnet unit 5 are positioned in a way the poles on either strip 20 alternates in polarity (N-pole, S-pole) circularly around the rotor 3.

It was impossible or virtually impossible for the permanent-magnet generator constructed as stated earlier to weaken the magnetic force established by the permanent-magnet strips 20 of the permanent magnet unit 5. To cope with this, the permanent-magnetic generator has provided therein with the flux regulator ring 7 lying within a circular clearance 22 defined between the disposed between the rotor 3 and the stator 4 to move in circumferential direction relatively to the stator 4. Circular movement of the flux regulator ring 7 upon high rpm of the rotor 3 results in increasing or decreasing the air gaps for magnetic path between the stator teeth 10 and the corresponding teeth 10 around the flux regulator ring 7 to thereby maintain the generated voltage within the acceptable limits. Meanwhile, an amount of magnetic flux regulated by the flux regulator ring 7 would be considered to be, at most, only a matter of 50 to 60%. If the high-power permanent-magnet generator is designed to create a prescribed electric power at, for example 1000 rpm, it would be expected to universally maintain the generated voltage within the prescribed levels before reaching up to 2000 rpm, regardless of whether there is any variation in load and/or rpm. Nevertheless, the high-power permanent-magnet generator of the sort stated here is too small in generated voltage and therefore in output power under operating condition of very low speed or very low rpm. The electromotive force "$E_0$" does not go high if the number of turns, magnetic force and frequency remain less. The electromotive force "$E_0$" cannot be expected to go high to render the output power more so long as the rpm is especially remains very low. Another likely scenario to raise the electromotive force "$E_0$" is increasing the number of turns in the winding 14. However, this causes large inductance and thereby chokes the generated current.

The high-power permanent-magnet generator of the present invention is especially envisaged rendering the voltage more and thereby producing large output even under the low rpm of the rotor 3 while getting rid of excess number of turns in the winding. To this end, the present high-power permanent-magnet generator features that the winding 14 is divided into the first and second winding parts 18, 19 to keep their inductances less, and the first and second winding parts 18 and 19 are laid one over the other to thereby raise the generated output with no increase of inductance. The high-power permanent-magnet generator of the present invention, more especially, is characterized in that the winding 14 wound on the teeth 10 of the stator 4 is composed of some first winding parts 18 (18U, 18V, 18W) different in phase and some second winding parts (19U, 19V, 19W) different in phase to carry any polyphase current, for example three-phase current of U-phase, V-phase and W-phase, while the capacitors 30 are each placed between any two winding parts different in phase, or between 18U and 18V, 18U and 18W, 18V and 18W, 19U and 19V, 19U and 19W, and 19V and 19W. The first and second winding parts 18 and 19 are made in two three-phase winding arrangements independent from one another. The first and second winding parts 18 and 19 are wound on the stator teeth 10 in a way staggered one another by one or two slots 11 separating any two adjacent teeth of the successive stator teeth 10.

With the high-power permanent-magnet generator constructed as stated earlier, the first three-phase first winding parts 18 (18U, 18V, 18W) have the output terminals 17 (17U, 17V, 17W), respectively, which are connected to the output lines 36 (36U, 36V, 36W) extending to the load 12 through the respective switches 26 (26U, 26V, 26W). Likewise, the three-phase second winding parts 19 (19U, 19V, 19W) are connected to the output lines 36 (36U, 36V, 36W) having therein the respective switches 24 (24U, 24V, 24W). The first winding part 18 is connected to the load 12 through the three-phase rectifier 23 while the second winding part 19 is connected to the load 12 through another three-phase rectifier 29. The three-phase rectifier 23 is provided at the output side thereof with a seventh switch 40 while the three-phase rectifier 29 has at the output side thereof with a sixth switch 41. The three-phase rectifiers 23 and 29 are connected each other across a fifth switch 39. Moreover, the intermediate output lines 38 (38U, 38V, 38W) of U-phase, V-phase and W-phase are tapped at the midway locations 28 (28U, 28V, 28W) out of the first winding part 18 of the stator winding 14. The capacitors 30 are each installed between any two intermediate output lines 38 (38U, 38V, 38W) different in phase. The intermediate output lines 38 (38U, 38V, 38W) are connected to the load 12 through the three-phase rectifiers 44, 45 wired in parallel. The three-phase rectifier 45 is provided with the fourth switches 43 (43U, 43V, 43W).

Figure 4:
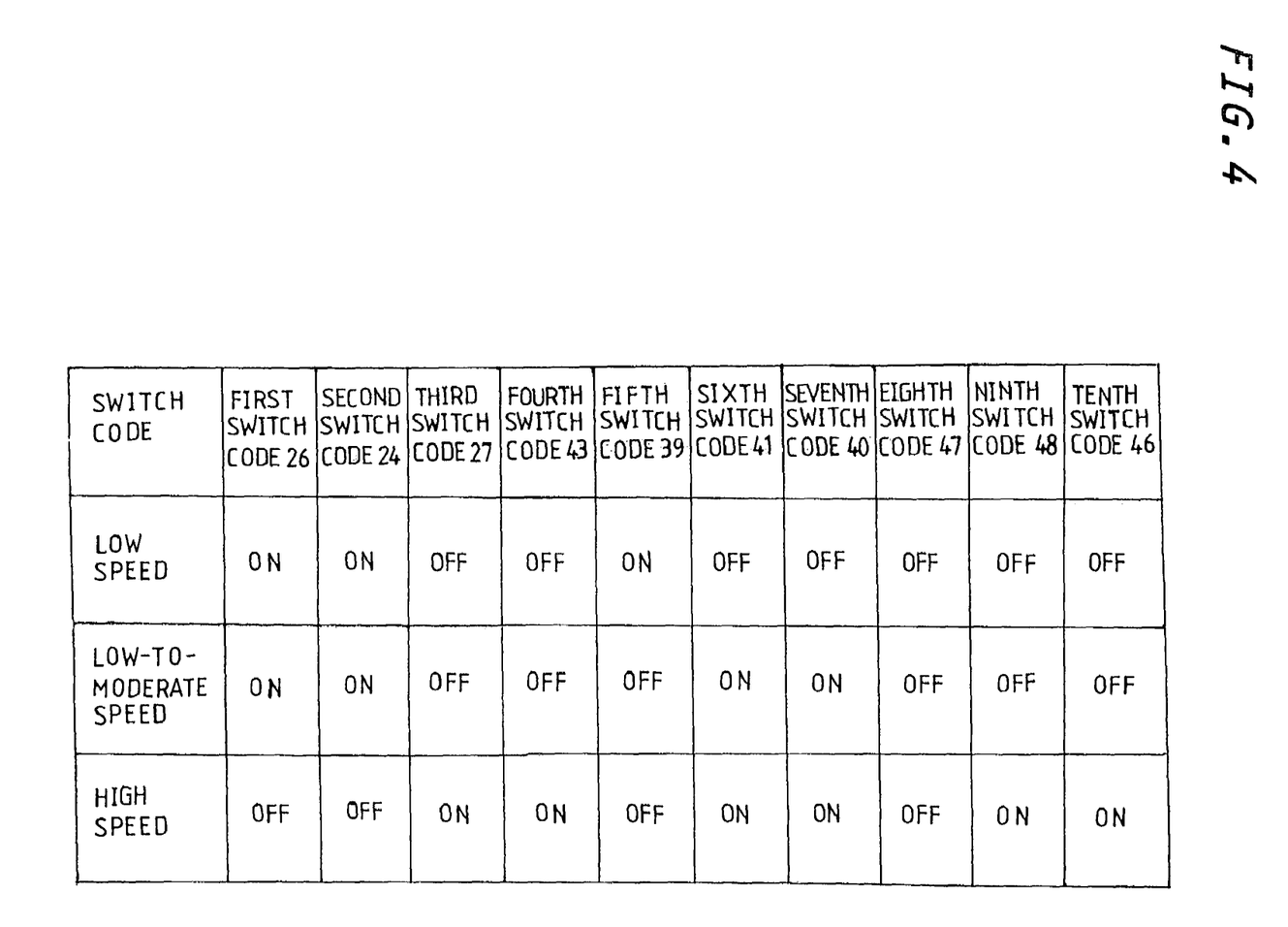
FIG. 4 is a view explanatory of how on-off operations of switches are performed depending on load applied to the high-power permanent-magnet generator of the present invention.

With the high-power permanent-magnet generator constructed as stated earlier, a controller actuates the switches as shown in FIG. 4 depending on the rpm of the rotor 3 to thereby maintain the voltage of the generator within the prescribed limits. Having illustrated some typical operations, other alternative switching operations may be carried out.

(1) When the rotor 3 revolves at low speed, the switches 24, 26 and 39 are turned on, whereas the switches 27, 40, 41, 43 and 46 to 48 are all turned off so that the first and second winding parts 18 and 19 are both energized while the rectifiers 23 and 29 are connected together in series. With the high-power permanent-magnet generator in which the rotor 3 is driven at a low speed, the rectifiers 23 and 29 are connected together in series to get the first and second winding parts 18 and 19 connecting with each other in series to store the current in the capacitors 30 installed between the different phases. The current stored is then added to the subsequent current flowing to correspondingly raise the voltage and thereby boost up the generated power to make sure of constantly supplying a prescribed voltage to the load 12.

(2) When the rotor 3 revolves at low-to-moderate speed, the switches 24, 26, 40 and 41 are turned on and the switches 27, 39, 43 and 46 to 48 are all turned off so that the first and second winding parts 18 and 19 are both energized while the rectifiers 23 and 29 are connected together in parallel. With the high-power permanent-magnet generator in which the rotor 3 is driven at low-to-moderate speed, the rectifiers 23 and 29 are connected together in parallel to cause the first and second winding parts 18 and 19 to connect with each other in parallel to store the current in the capacitors 30 installed between the different phases. The current stored is then added to the subsequent current flowing to correspondingly raise the voltage and thereby boost up the generated power to make sure of constantly supplying a prescribed voltage to the load 12.

(3) When the rotor 3 revolves at high speed, the switches 24, 26, 39 and 47 are turned off and the switches 27, 40, 41, 43, 46 and 48 are all turned on so that the first and second winding parts 18 and 19 of the stator winding 18 are both tapped at their respective intermediate locations 28 and 35 while the rectifiers 24 and 45 are connected with one another in parallel. With the high-power permanent-magnet generator in which the rotor 3 is rotated at a high speed, the rectifiers 23 and 29 are connected together in parallel to present no output to the output lines 36, 37 at the ends of the windings 18, 19. Thus, the output on the intermediate output lines 38, 42 tapped at the intermediate locations 28, 35 of the first and second winding parts 18, 19 is processed through the rectifiers 44 and 45 connected together in parallel, so that the current is stored in the associated capacitors 30. The current stored is then added to the subsequent current flowing to correspondingly raise the voltage and thereby boost up the generated power to make sure of constantly supplying a prescribed voltage to the load 12.

What is claimed is:

1. A high-power permanent-magnet generator; comprising a rotating shaft supported for rotation in a stator housing, a rotor fastened on the rotating shaft and provided with a permanent magnet unit of permanent magnet strips positioned at an interval around the rotor, a stator installed inside the stator housing and provided with a winding wound around stator teeth lying at an interval in a circular direction, a flux regulator ring lying between the stator and the rotor for circular movement relatively to the stator, and a flux regulator means operated to increase or decrease an air gap for flux path between the stator and the flux regulator ring to regulate a magnetic flux flowing in the stator;

wherein the winding is composed of a first winding part and a second winding part, which are each made independent from one another and made in a three-phase arrangement of U-phase, V-phase and W-phase, the first and second winding parts being wound on the stator teeth in a way staggered one another by one or two slots separating any two adjacent teeth; and wherein the first and second winding parts each have full output lines of the U-phase, V-phase and W-phase led out at respective winding ends and intermediate output lines of U-phase, V-phase and W-phase tapped at respective midway locations of the winding parts, three-phase circuit includes therein three-phase full-wave rectifier circuits connected to the U-phase outputs, V-phase outputs and W-phase outputs of the full output lines and the intermediate output lines, capacitors installed between different phases, and switching means to switch the three-phase circuits from on to another of series connection and parallel connection dependent on output levels, and wherein the first winding part has first output lines of three phases, which are each provided with first switches and further connected across respective first capacitors to the remaining output lines of different phases, the second winding part has second output lines of three phases, which are each provided with second switches and further connected across respective second capacitors to the remaining output lines of different phases, the first winding part has intermediate output lines of three phases, which are each tapped at their associated midway locations of the first winding part, the intermediate output lines being each provided with third switches and further connected across respective third capacitors to the remaining intermediate output lines of different phases, the second winding part has intermediate output lines of three phases, which are each tapped at their associated midway locations of the second winding part, the intermediate output lines being each provided with fourth switches and further connected across respective fourth capacitors to the remaining intermediate output lines of different phases, and the first and second output lines and intermediate output lines are all connected to a load through rectifiers of the three-phase full-wave rectifier circuits.

2. A high-power permanent-magnet generator constructed as defined in claim 1, wherein the rectifiers are composed of first rectifiers connected with the first output lines through a seventh switch, second rectifiers connected with the second output lines through a sixth switch, third rectifiers connected with the first intermediate output lines through a ninth switch, and fourth rectifiers connected with the second intermediate output lines through a tenth switch, the first and second rectifiers being connected with one another through a fifth switch while the third and fourth rectifiers being connected with one another through an eighth switch.

3. A high-power permanent-magnet generator constructed as define in claim 2, wherein output terminals of the first and second rectifiers and output terminals of the third and fourth rectifiers are all connected to the load though the fifth to tenth switches in a way the output terminals of the first and second rectifiers make either series or parallel connection with output terminals of the third and fourth rectifiers.

4. A high-power permanent-magnet generator constructed as define in claim 2, wherein the first to tenth switches are governed to make on-off operation in response to an rpm of the rotor to generate a voltage within a prescribed limits.

5. A high-power permanent-magnet generator constructed as define in claim 3, wherein the first and second output lines make series connection when the rotor is driven at low speed, making parallel connection when the rotor is driven at low-to-moderate speed, and the first intermediate output lines of the first winding part and the second intermediate output lines of the second winding part make parallel connection when the rotor is driven at high speed.

6. A high-power permanent-magnet generator constructed as define in claim 4, wherein the first, second and fifth switches are closed whereas the third, fourth, sixth and seventh switches are opened in response to a low speed rotation of the rotor to energize both the first and second winding parts and thereby the first and second rectifiers are brought into series connection.

7. A high-power permanent-magnet generator constructed as define in claim 4, wherein the first, second, sixth and seventh switches are closed whereas the third, fourth and fifth switches are opened in response to a low-to-moderate speed rotation of the rotor to energize both the first and second winding parts and thereby the first and second rectifiers are brought into parallel connection.

8. A high-power permanent-magnet generator constructed as define in claim 4, wherein the first, second, fifth and eighth switched are opened whereas the third, fourth, sixth, seventh, ninth and tenth switches are closed in response to a high speed rotation of the rotor to energize both the first and second intermediate output lines of the second winding part and thereby the first and second rectifiers are brought into parallel connection while the third and fourth rectifiers are also brought into parallel connection.

* * * * *